United States Patent
Hung

(10) Patent No.: US 9,341,789 B2
(45) Date of Patent: *May 17, 2016

(54) OPTICAL COUPLING LENS AND METHOD FOR TESTING SAME

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,804

(22) Filed: Aug. 25, 2014

(65) Prior Publication Data

US 2015/0062565 A1    Mar. 5, 2015

(51) Int. Cl.
*G02B 6/32* (2006.01)
*G01M 11/02* (2006.01)

(52) U.S. Cl.
CPC ............. *G02B 6/32* (2013.01); *G01M 11/0221* (2013.01)

(58) Field of Classification Search
CPC .... G01M 11/02; G01M 11/0221; G02B 6/26; G02B 6/262; G02B 6/32; G02B 17/0876; G02B 17/0868; G02B 27/283
USPC ............... 356/124–127; 385/33, 35; 359/726, 359/664, 653, 652, 566, 618
See application file for complete search history.

(56) References Cited

U.S. PATENT DOCUMENTS

| 8,787,715 | B2 * | 7/2014 | Hung | G02B 6/42 385/33 |
| 8,976,346 | B2 * | 3/2015 | Hung | G02B 6/32 356/218 |
| 9,000,352 | B2 * | 4/2015 | Sun | G01J 1/0407 250/216 |
| 2011/0097037 | A1 * | 4/2011 | Kuznia | G02B 6/4214 385/33 |
| 2014/0168496 | A1 * | 6/2014 | Hung | G02B 17/0876 348/335 |
| 2015/0002839 | A1 * | 1/2015 | Hung | G02B 6/32 356/124 |

* cited by examiner

*Primary Examiner* — Hoa Pham
(74) *Attorney, Agent, or Firm* — Novak Druce Connolly Bove + Quigg LLP

(57) ABSTRACT

An optical coupling lens includes a first reference portion, a second reference portion and a main portion sandwiched between the first reference portion and the second reference portion. The main portion includes a first surface having at least one first converging lens, a second surface having at least one second converging lenses, and a reflecting surface. The second surface is substantially perpendicular to the first surface forming intersection line. An angle between the reflecting surface and the first surface is about 45 degrees. Each reference portion includes a reference member. The reference member includes a reference point. A connecting line of the reference points of the reference portions is substantially parallel to the intersection line.

14 Claims, 4 Drawing Sheets

OPTICAL COUPLING LENS AND METHOD FOR TESTING SAME

FIELD

The present disclosure relates to optical communication devices, and particularly to an optical coupling lens and a method for testing the optical coupling lens.

BACKGROUND

In optical communication devices, an optical coupling lens is employed to couple optical signals between an optical emitter/receiver and an optical fiber. The optical coupling lens includes a light incident surface, a light emergent surface, and a reflecting surface. The reflecting surface is for reflecting optical signals between the light incident surface and the light emergent surface. The optical coupling lens includes at least one first converging lens formed on the light incident surface, and at least one second converging lens formed on the light emergent surface.

BRIEF DESCRIPTION OF THE DRAWINGS

Implementations of the present technology will now be described, by way of example only, with reference to the attached figures, wherein.

DETAILED DESCRIPTION

Figure 1:
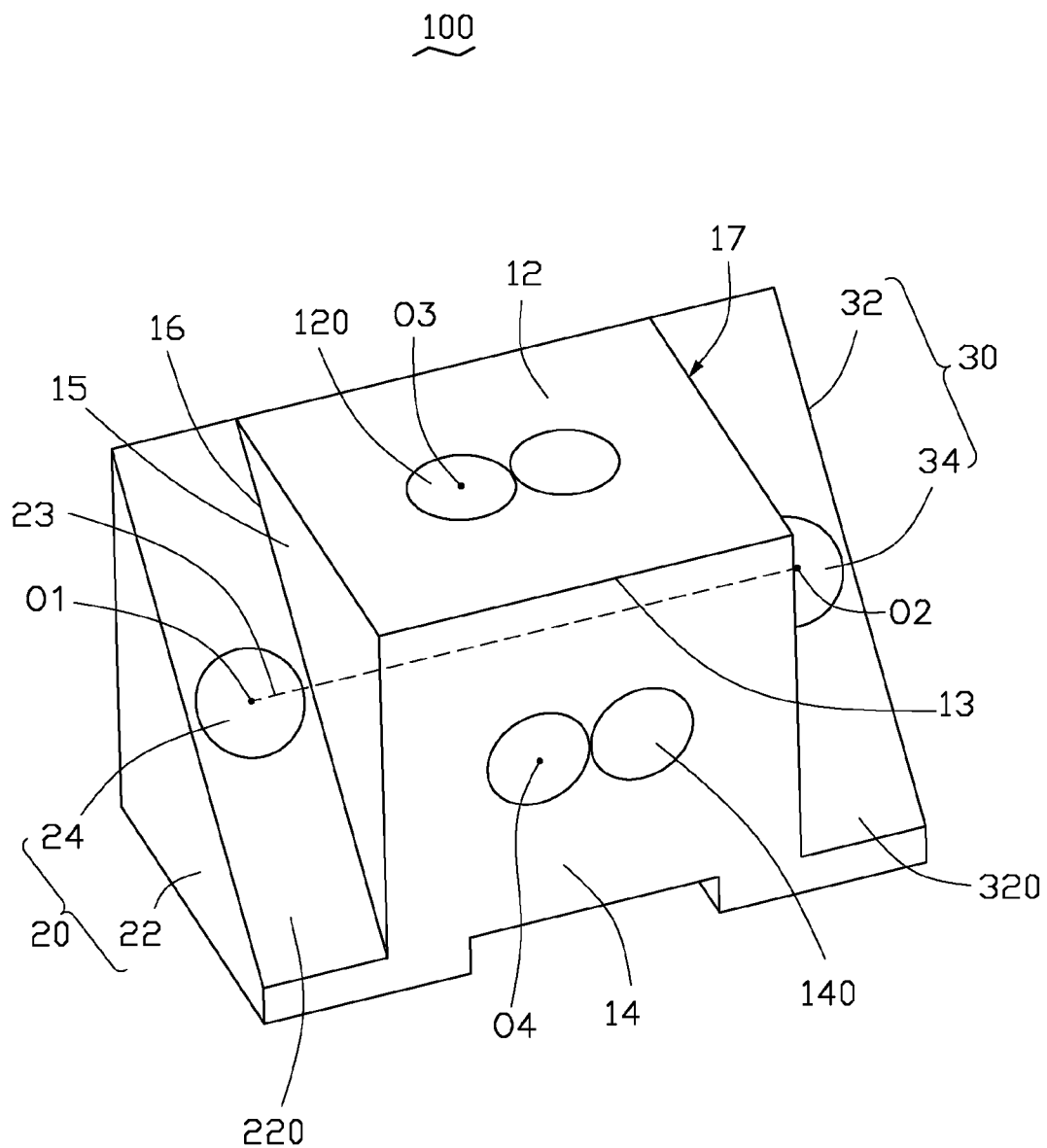
FIG. 1 is an isometric view of an embodiment of an optical coupling lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; the references "a plurality of" and "a number of" mean "at least two." It specifically indicates open-ended inclusion or membership in the so-described combination, group, series and the like. It should be noted that references to "an" or "one" embodiment in this disclosure are not necessarily to the same embodiment, and such references mean "at least one."

The disclosure is described in relation to an optical coupling lens.

Figure 2:
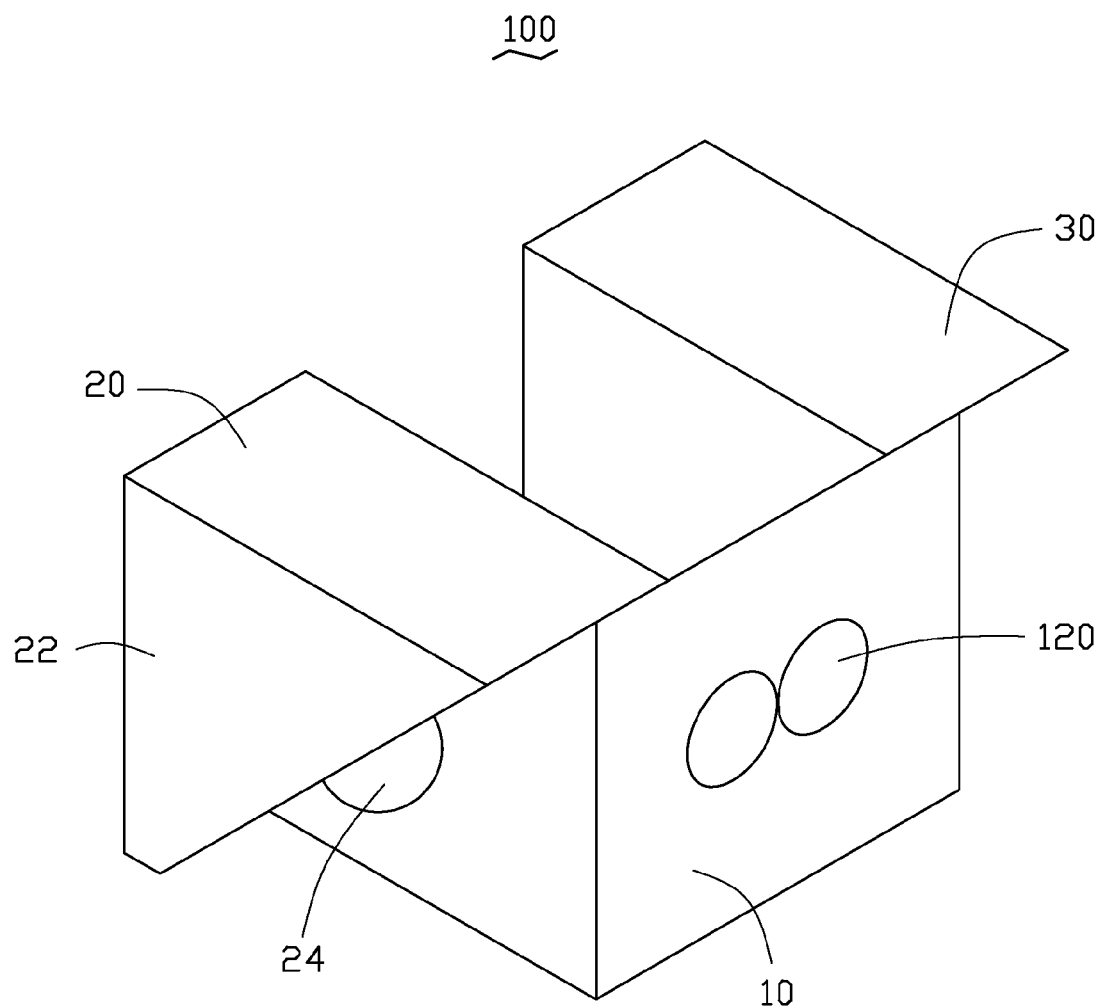
FIG. 2 is a bottom view of the optical coupling lens of FIG. 1.
Figure 3:
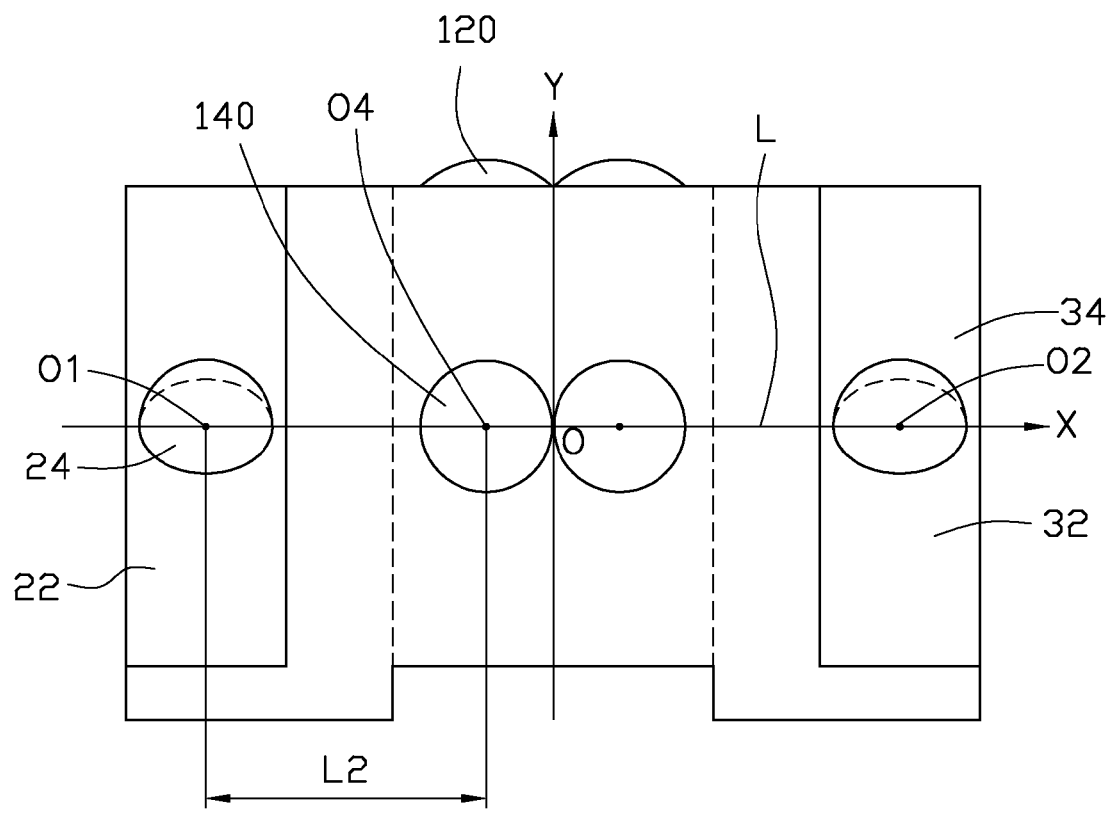
FIG. 3 is a front view of the optical coupling lens of FIG. 1.
Figure 4:
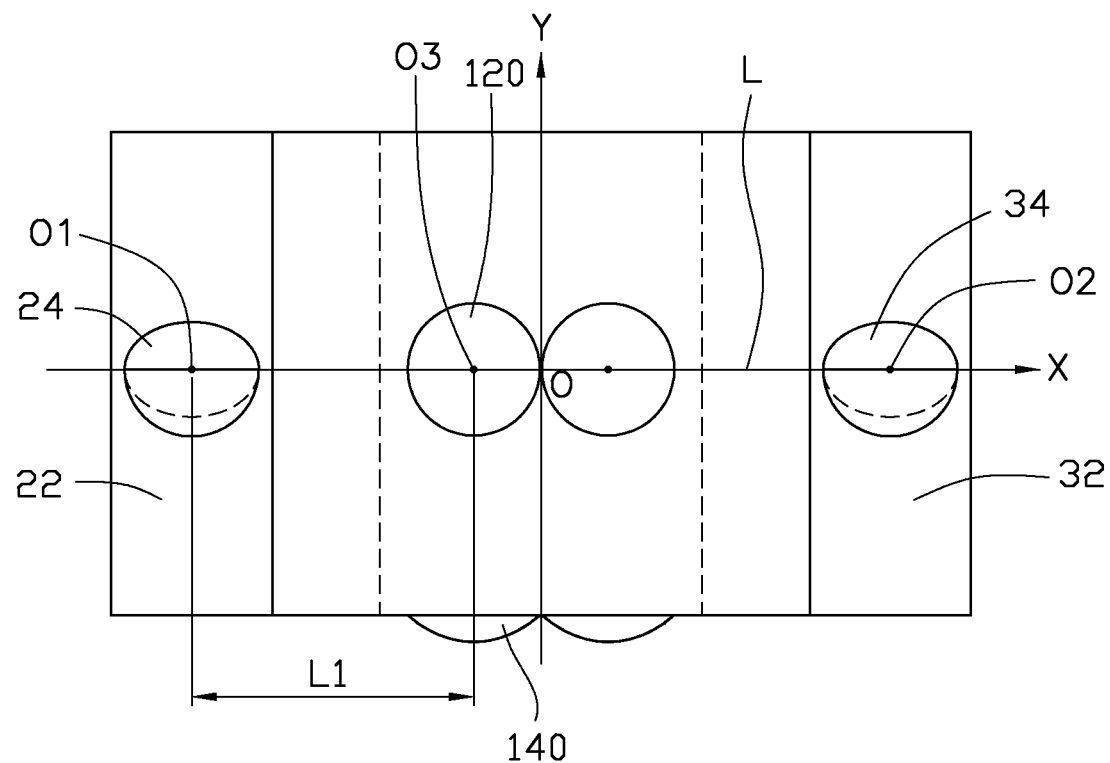
FIG. 4 is a top view of the optical coupling lens of FIG. 1.

FIGS. 1-4 illustrate an exemplary embodiment of an optical coupling lens of the present disclosure. The optical coupling lens 100 includes a main portion 10, a first reference portion 20 and a second reference portion 30.

The main portion 10 can be a substantially triangular prism and include a first surface 12, a second surface 14, a reflecting surface 16, a first end surface 15, and a second end surface 17. The first surface 12 is substantially perpendicular to the second surface 14 forming an intersection line 13. An angle between the reflecting surface 16 and the first surface 12 is about 45 degrees, and an angle between the reflecting surface 13 and the second surface 12 is about 45 degrees. The second end surface 17 is opposite to the first end surface 15. Both the first end surface 15 and the second end surface 17 are perpendicular to the first surface 12, and the second surface 14.

The main portion 10 includes two first converging lenses 120 located on the first surface 12, and two second converging lenses 140 located on the second surface 14. Each of the first converging lenses 120 corresponds to one of the second converging lenses 140. An optical axis of each first converging lens 120 is substantially perpendicular to the first surface 12, and an optical axis of each second converging lens 140 is substantially perpendicular to the second surface 14. Thus, the optical axis of each first converging lens 120 is substantially perpendicular to the optical axis of each second converging lens 140. In at least one embodiment, the first and second converging lenses 120, 140 are convex lenses and the first and second converging lenses 120, 140 are substantially circular. It is understood that a number of the first and second converging lenses 120, 140 is not limited by this embodiment and can be changed according to different requirements.

The first reference portion 20 is connected to the first end surface 15 of the main portion 10, and includes a first supporting member 22 and a reference member 24 arranged on the first supporting member 22. The first supporting member 22 is a substantially triangular prism and includes a first supporting surface 220. The first supporting surface 220 is substantially rectangular and coplanar with the reflecting surface 16. In at least one embodiment, the first reference member 24 is substantially hemispherical, and a reference point of the first reference member 34 is a spherical center of the hemispherical and located on the second supporting surface 320.

The second reference portion 30 is connected to the second end surface 17 of the main portion 10, and includes a second supporting member 32 and a reference member 34 arranged on the second supporting member 32. The second supporting member 32 is substantially a triangular prism and includes a second supporting surface 320. The second supporting surface 320 is substantially rectangle and coplanar with the reflecting surface 16. In one embodiment, the reference member 34 is substantially hemispherical and located in a middle position of the second supporting surface 320. A reference point of the reference member 34 is a spherical center of the hemispherical and located on the second supporting surface 320. In at least one embodiment, a size of the second reference member 34 is the same as a size of the first reference member 24. The first and second reference member 24, 34 are configured for determining a position relationship between the first and second converging lenses 120, 140. In at least one embodiment, the first reference member 24 defines a first spherical center O1, the second reference member 34 defines a second spherical center O2, a connection line 23 between the first spherical center O1 and the second spherical center O2 is parallel to the intersection line 13. The connecting line 23 is in a surface coplanar with the reflecting surface 16.

When the optical coupling lens 100 is manufactured, a position relationship between the first converging lenses 120 and the seconds converging lenses 140 can be tested by the first and second reference portion 20, 30. In a front view of the optical coupling lens 100 (FIG. 3), if lens centers of the first converging lenses 120 are both on the connecting line 23, it can be determined that the first converging lenses 120 are in predetermined positions. In a top view of the optical coupling lens 100 (FIG. 4), if lens centers of the second converging lenses 140 are both on the connecting line 23, it can be determined that the second converging lenses 140 are in predetermined positions. The first converging lens 120 which is adjacent to the first reference member 24 defines a first lens center O3. The second converging lens 140 which is adjacent to the first reference member 24 defines a second lens center O4, a first distance between the first spherical center O1 and the first lens center O3 is L1, a second distance between the second spherical center O2 and the second lens center O4 is L2, if L1=L2, it can be determined that the first converging lens 120 and the second converging lens 140 are together in predetermined positions.

First distance L1 and second distance L2 are calculated by the two-dimensional coordinates of O1, O2, O3 and O4. Two-dimensional coordinates of the first and second spherical centers O1, O2 of the first and second reference member 24, 34 can be determined using a microscope, two-dimensional coordinates of lens centers O3, O4 can be determined using a microscope.

In detail, the first and second spherical centers O1, O2 are defined using a microscope, X axis is determined along a direction of the connection line of spherical centers O1, O2, and origin point O is a midpoint of the connection line of spherical centers O1, O2. Y axis is determined along a direction perpendicular to the connection line of spherical centers O1, O2, and a two-dimensional coordinate of the midpoint O is (0,0), two-dimensional coordinate of the spherical centers O1, O2 are (x1,0), (x2,0) respectively. A two-dimensional coordinate (x4, y4) of the center O4 of the second converging lens 140 is determined via a front view of the optical coupling lens 100, if y4=0, it can be determined that the second converging lens 140 is in a predetermined position. A two-dimensional coordinate (x3, y3) of the lens center O3 of the second converging lens 120 is determined via a top view of the optical coupling lens 100, if y3=0, it means that the first converging lens 120 is in a predetermined position. A first distance L1 is calculated by equation L1=|X3−X1|. A second distance L2 is calculated by equation L2=|X4−X1|, If L1=L2, it means that the first converging lens 120 and the second converging lens 140 are together in predetermined positions, and the optical coupling lens 100 is a qualified product.

In at least one embodiment, one reference portion 20 is located adjacent to the first end surface 15, and the other reference portion 20 is located adjacent to the second end surface 17. Alternatively, the reference portions 20 can both be located at one side of the first end surface 15 or one side of the second end surface 17, as long as the connecting line 23 between the spherical centers of the reference members 24 and 34 is substantially parallel to the intersection line 13 formed by the first surface 12 and the second surface 14.

In at least one embodiment, the first and second reference portion 20, 30 are integrally formed with the main portion 10. Alternatively, the first and second reference portion 20, 30 can be detachably connected to the main portion 10 in other embodiments. Thus, the first and second reference portion 20, 30 can be reusable in testing different optical coupling lenses 100.

In summary, when the optical coupling lens 100 is manufactured, the first reference member and the second reference member are configured for conveniently testing whether the first converging lens and the second converging lens in a predetermined positions, avoid occurring defective products.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the disclosure.

What is claimed is:

1. An optical coupling lens comprising:
    a main portion comprising:
        a first surface having at least one first converging lens formed thereon, the first converging lens having an optical axis substantially perpendicular to the first surface;
        a second surface having at least one second converging lenses formed thereon, the second surface being substantially perpendicular to the first surface thereby forming intersection line, and the second converging lens having an optical axis substantially perpendicular to the second surface; and
        a reflecting surface for reflecting optical signals between the first converging lens and the second converging lens, so that an angle formed between the reflecting surface and the first surface is substantial 45 degrees;
    a first reference portion arranged at one side of the main portion and comprising a first reference member; and
    a second reference portion arranged at another side of the main portion and comprising a second reference member, the first reference member comprising a first reference point and the second reference member comprising a second reference point, wherein a connection line between the first reference point and a second reference point is substantially parallel to the intersection line.

2. The optical coupling lens of claim 1, wherein the main portion is substantially a triangular prism, and further comprises a first end surface and a second end surface opposite to the first end surface, both the first end surface and the second end surface are perpendicularly to the first surface, both the first end surface and the second end surface are perpendicularly to the second surface.

3. The optical coupling lens of claim 2, wherein the first reference portion is connected with the first side surface, the first reference portion is substantially a triangular prism, and includes a first supporting member and a reference member arranged on the first supporting member.

4. The optical coupling lens of claim 3, wherein the first supporting member includes a first supporting surface, the reference member is substantially hemispherical and a reference point of the reference member is a spherical center of the hemispherical and located on the second surface.

5. The optical coupling lens of claim 4, wherein the first supporting surface is coplanar with the reflecting surface.

6. The optical coupling lens of claim 5, wherein the second reference portion is connected with the second side surface, the second reference portion is substantially a triangular prism, and includes a second supporting member and a reference member arranged on the second supporting member.

7. The optical coupling lens of claim 6, wherein the second supporting member includes a second supporting surface, the second reference member is substantially hemispherical and a reference point of the second reference member is a spherical center of the hemispherical and located on the second supporting surface.

8. The optical coupling lens of claim 7, wherein the first supporting surface is coplanar with the reflecting surface.

9. The optical coupling lens of claim 6, wherein a size of the second reference member is the same as a size of the first reference member.

10. A method for testing an optical coupling lens comprising:
  a main portion and two reference portions, the main portion comprising a first surface having at least one first converging lens formed thereon, a second surface having at least one second converging lenses formed thereon, and a reflecting surface for reflecting optical signals between the first converging lens and the second lens, an optical axis of the first converging lens being substantially perpendicular to the first surface, the second surface being substantially perpendicular to the first surface, and an optical axis of the second converging lens being substantially perpendicular to the second surface, an angle between reflecting surface and the first surface is substantial 45 degrees, a first reference portion arranged at one side of the main portion and comprising a first reference member, a second reference portion arranged at another side of the main portion and comprising a second reference member, the first and second reference members are substantially hemispherical, the first reference member comprising a first reference point, the second reference member comprising a second reference point, the first and second reference points are spherical centers of the hemispherical, the method comprising:
  determining whether a center of the first converging lens being on a connecting line of the spherical centers of the first and second reference members, viewing from an angle substantially perpendicular to the first surface; and
  determining whether a center of the second converging lens being on a connecting line of the spherical centers of the first and second reference members, viewing from an angle substantially perpendicular to the second surface.

11. The method of claim 10, wherein if the center of the first converging lens is on the connecting line of the spherical centers, it is determined that the first converging lens is at a predetermined positions.

12. The method of claim 11, wherein if the reference point of the second converging lens is on the connecting ling of the spherical centers, it is determined that the second converging lens is at a predetermined positions.

13. The method of claim 11, wherein the first converging lens which close to the first reference member comprising a first lens center, the first reference member comprising a first spherical center, the second converging lens which close to the first reference member comprising a second lens center, a distance between the first spherical center and the first lens center is L1, a second distance between the second spherical center and the second lens center is L2, if L1=L2, it can be determined that the first converging lens and the second converging lens are both in predetermined positions.

14. An optical coupling lens, comprising:
  a main portion comprising:
    a first surface having at least one first converging lens formed thereon, an optical axis of the first converging lens being substantially perpendicular to the first surface;
    a second surface having at least one second converging lenses formed thereon, the second surface being substantially perpendicular to the first surface forming intersection line, and an optical axis of the second converging lens being substantially perpendicular to the second surface;
    a reflecting surface for reflecting optical signals between the first converging lens and the second converging lens, an angle between the reflecting surface and the first surface is substantial 45 degree;
  a first reference portion arranged at one side of the main portion and comprising a first reference member; and
  a second reference portion arranged at the other side of the main portion and comprising a second reference member, the first reference member comprising a first reference point, the second reference member comprising a second reference point, wherein a connection line between the first reference point and a second reference point is substantially parallel to the intersection line, and resides in a surface which is coplanar with the reflecting surface.

* * * * *